US005388942A

United States Patent [19]

Bonacina et al.

[11] Patent Number: 5,388,942

[45] Date of Patent: Feb. 14, 1995

[54] FLANGE LOCKS

[75] Inventors: Sergio Bonacina, Galbiate; Guiseppe L. Cuneo, Calolziocorte, both of Italy

[73] Assignee: Black & Decker Inc., Newark, Del.

[21] Appl. No.: 19,013

[22] Filed: Feb. 18, 1993

[30] Foreign Application Priority Data

Feb. 28, 1992 [GB] United Kingdom ................. 9204345

[51] Int. Cl.[6] ................................................ F16B 37/08

[52] U.S. Cl. ...................................... 411/432; 411/348

[58] Field of Search ............... 411/432, 535, 272, 312, 411/348, 935, 350, 297, 298; 403/259, 24

[56] References Cited

U.S. PATENT DOCUMENTS

| | | | |
|---|---|---|---|
| 3,533,636 | 10/1970 | Firestone et al. | 279/4 |
| 4,322,190 | 3/1982 | Anderson | 409/234 |
| 4,525,097 | 6/1985 | Ziegelmeyer | 403/259 |
| 4,850,154 | 7/1989 | Grammer et al. . | |
| 4,941,790 | 7/1990 | Kirn . | |
| 4,955,744 | 9/1990 | Barth et al. | 411/432 X |
| 5,042,207 | 8/1991 | Kirn . | |
| 5,161,334 | 11/1992 | Schaal et al. | 51/168 |

FOREIGN PATENT DOCUMENTS

| | | | |
|---|---|---|---|
| 0381809 | 7/1989 | European Pat. Off. . | |
| 462178 | 1/1914 | France | 411/348 |
| 3903767 | 8/1990 | Germany . | |
| 8804975 | 7/1988 | WIPO . | |
| 9000463 | 1/1990 | WIPO . | |

*Primary Examiner*—Rodney M. Lindsey

*Attorney, Agent, or Firm*—Charles E. Yocum; Dennis A. Dearing; John D. Del Ponti

[57] ABSTRACT

A flange lock for securing a disk 8 on the spindle 10 of a power tool is described. It comprises a boss 11 screwable on the spindle and inner and outer flanges 4,1 non-rotatably mounted on said boss 11 so as to be relatively movable thereon between a first, separated relation rigid with said boss and a second, less separated relation. Separation balls 5 are mounted between the flanges 4,1 and disposable between a first condition in which the flanges are maintained in the first, separated relation and a second condition in which the flanges 4,1 are able to move relatively together to the second, less separated condition. An actuator 2 disposes the separation balls 5 between said two conditions in such a manner that by screwing the flange lock on to the power tool spindle 10 to secure a disk 8 thereon by engaging the inner flange 4 against the disk 8 with the flanges 4,1 maintained in the first, separated condition so that the flanges are pressed together through the separation balls 5, disposal of the separation balls to the second condition will serve to relieve the pressure between the flanges whereby unscrewing of the flange lock is facilitated (FIG. 1).

26 Claims, 6 Drawing Sheets

FLANGE LOCKS

BACKGROUND OF THE INVENTION

This invention relates to flange locks for securing rotary disks on to the spindles of power tools, such as a grinding wheel on to the spindle of an angle grinder or a circular saw blade on to the spindle of a circular saw.

Conventionally the spindles of such tools are screw threaded and the disks have been secured by a lock nut which is locked in place by a spanner and which must also be released by use of the spanner. More recently flange locks have been developed which can be safely secured and released by hand without the use of a tool and examples of such flange locks are to be found in U.S. Pat. Nos. 4,850,154, 4,941,790 and 5,042,207, and European Patent Application 0381809.

It is an object of the present invention to provide an improved flange lock which can be secured and released by hand.

SUMMARY OF THE INVENTION

To this end, from one aspect, the invention provides a flange lock for securing a disk on the spindle of a power tool, comprising a boss screwable on the spindle, inner and outer flanges non rotatably mounted on said boss so as to be relatively movable thereon between a first, separated relation rigid with said boss and a second, less separated relation, separation means mounted between said flanges and disposable between a first condition in which said flanges are maintained in said first, separated relation and a second condition in which the flanges are able to move relatively together to said second, less separated condition, and means for disposing said separation means between said two conditions in such a manner that by screwing the flange lock on to the power tool spindle to secure a disk thereon by engaging said inner flange against the disk with said flanges maintained in said first, separated condition so that the flanges are pressed together through said separation means, disposal of said separation means to said second condition will serve to relieve the pressure between said flanges whereby unscrewing of the flange lock is facilitated.

Preferably, the outer flange is fixed rigid with said boss and the inner flange is movable inwardly along the boss to a limit position.

In a preferred form, the separation means comprises a plurality of elements spaced around said flanges and movable between first positions in which they cooperate with said flanges to maintain said flanges in said first separated condition and second positions in which the flanges are able to move relatively together to said second, less separated condition, and means are provided for releasably holding said elements in said first positions, said elements being movable to second positions upon release of said holding means by the flanges being pressed together. Suitably, the separation elements are in the form of rolling members, such as balls, which co-operate with ramp means on said flanges.

From another aspect, the invention provides a flange lock for securing a disk on the spindle of a power tool, comprising a boss screwable on the spindle, an outer flange fixed rigid with said boss and an inner flange non-rotatably mounted on the boss but axially movable thereon between an inner limit position in which the flanges are in a first, separated condition and a second position in which the flanges are in a second, less separated condition, a plurality of balls mounted between said flanges and movable between first positions in which they co-operate with ramp means on said flanges to maintain said flanges in said first, separated condition and second positions in which the inner flange is able to move towards the outer flange to said second, less separated condition, and means for releasably holding said balls in said first positions in such a manner that when the flange lock is screwed on to the power tool spindle to secure a disk thereon by engaging said inner flange against said disk with said flanges maintained in said first, separated condition so that said flanges are pressed together through said balls, release of said holding means will result in said balls being urged by said pressure along said ramp means to said second positions whereby the pressure between the inner flange and the disk is relieved and unscrewing of the flange lock is facilitated.

In such an arrangement, the ramp means suitably comprise inclined surfaces on one or both of said flanges, and each flange desirably has a number of ramps equal to the number of balls arranged in facing pairs along which said balls are movable. Furthermore, the ramps preferably extend circumferentially and means are provided for guiding said balls circumferentially along said ramps.

In a preferred embodiment, spring means urge said balls into said first positions, and the holding means includes a ring member mounted for limited rotation on the boss intermediate said flanges and rotatable in the direction in which the flange lock is screwed on to the spindle to a first limit position in which said balls are locked in said first positions thereof adjacent the upper ends of the ramps, rotation of the ring member in the opposite direction relative to the boss to a second limit position releasing the balls to permit them to run down the ramps. There are ideally three said balls equally spaced around the flange lock by a cage member rotatably mounted on the boss intermediate said flanges, said cage member including an annular wall member circumferentially between an inner face of said ring member and said boss, this wall member having an opening therethrough in which a locking ball larger than the thickness of the wall is positioned, said boss including a recess which in said first limit position of said ring member corresponding to the first positions of the separation balls is aligned with said opening and said locking ball is held partly in said opening and partly in said recess by said inner face of the ring member thus locking the cage against rotation relative to the boss (and thus the flanges), rotation of said ring member to its second limit position aligning a recess in said inner face of said ring member with said opening in said annular wall of said cage member allowing the locking ball to disengage from the recess in the boss and permit the cage member to rotate relative to the boss so that the balls can move down said ramps. Suitably, the opening in the annular wall member of said cage member is inclined in the direction in which said separation balls move down the ramps. A preferred arrangement includes three of the locking balls each engaging associated openings and recesses.

From a still further aspect, the invention provides a flange lock for securing a disk on the spindle of a rotary tool, comprising a boss screwable on the spindle, an outer flange rigid with the boss and mounted on the outer end thereof, an inner disk-engaging flange non-rotatably mounted on the boss inwardly of the first flange and slidable on the boss away from said outer flange to a limit position, co-operating circumferentially extending ramp means on said flanges, a plurality of balls mounted between the first and second flanges for movement along said ramp means between first rotary positions in which the balls co-operate with said ramp means to produce maximum separation of said flanges with said inner flange in its limit position and second rotary positions in which said inner flange can move towards said outer flange, spring means urging said balls to said first rotary positions, releasable locking means for locking said balls in said first rotary positions in which the flanges are separated with said inner flange in its limit position, and a ring member mounted on said boss intermediate said flanges for rotation between a first rotary limit position in which the releasable locking means is engaged and a second rotary limit position in which said locking means is disengaged whereby the pressure between said flanges created by screwing the flange lock onto a disk with the flanges separated by said balls raised up said ramp means can be relieved by releasing the balls such that they run down said ramp means due to the pressure of the flanges thus relieving the pressure between the inner flange and the disk and facilitating removal of the lock flange.

In order that the invention may be more readily understood, reference will now be made to the accompanying drawings.

DESCRIPTION OF PREFERRED EMBODIMENTS

Figure 1:
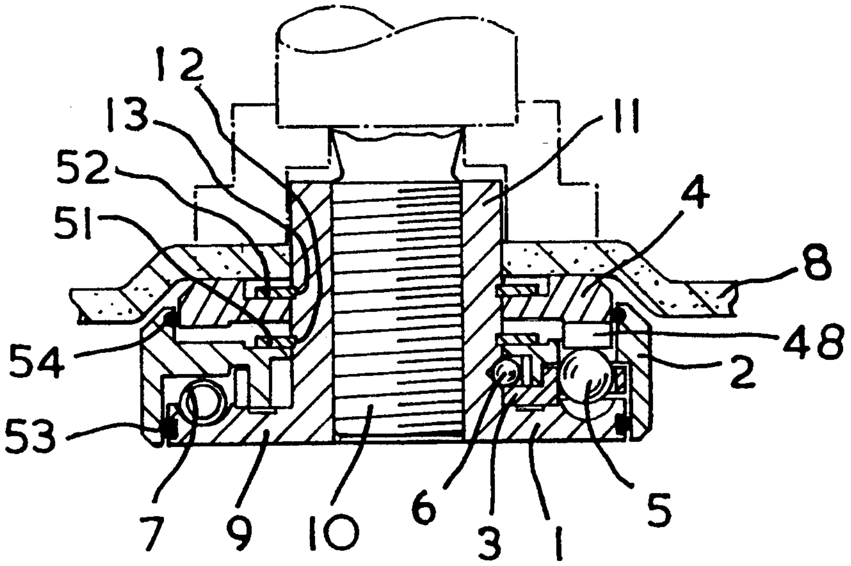
FIG. 1 is a cross section through one embodiment of flange lock according to the present invention showing the flange lock securing a grinding disk on the spindle of an angle grinder.
Figure 6:
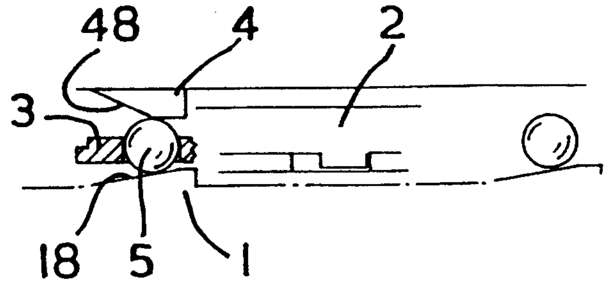
FIG. 6 is a schematic illustration of the relationship of a separation ball with ramps on the flanges of the flange lock.
Figure 2:
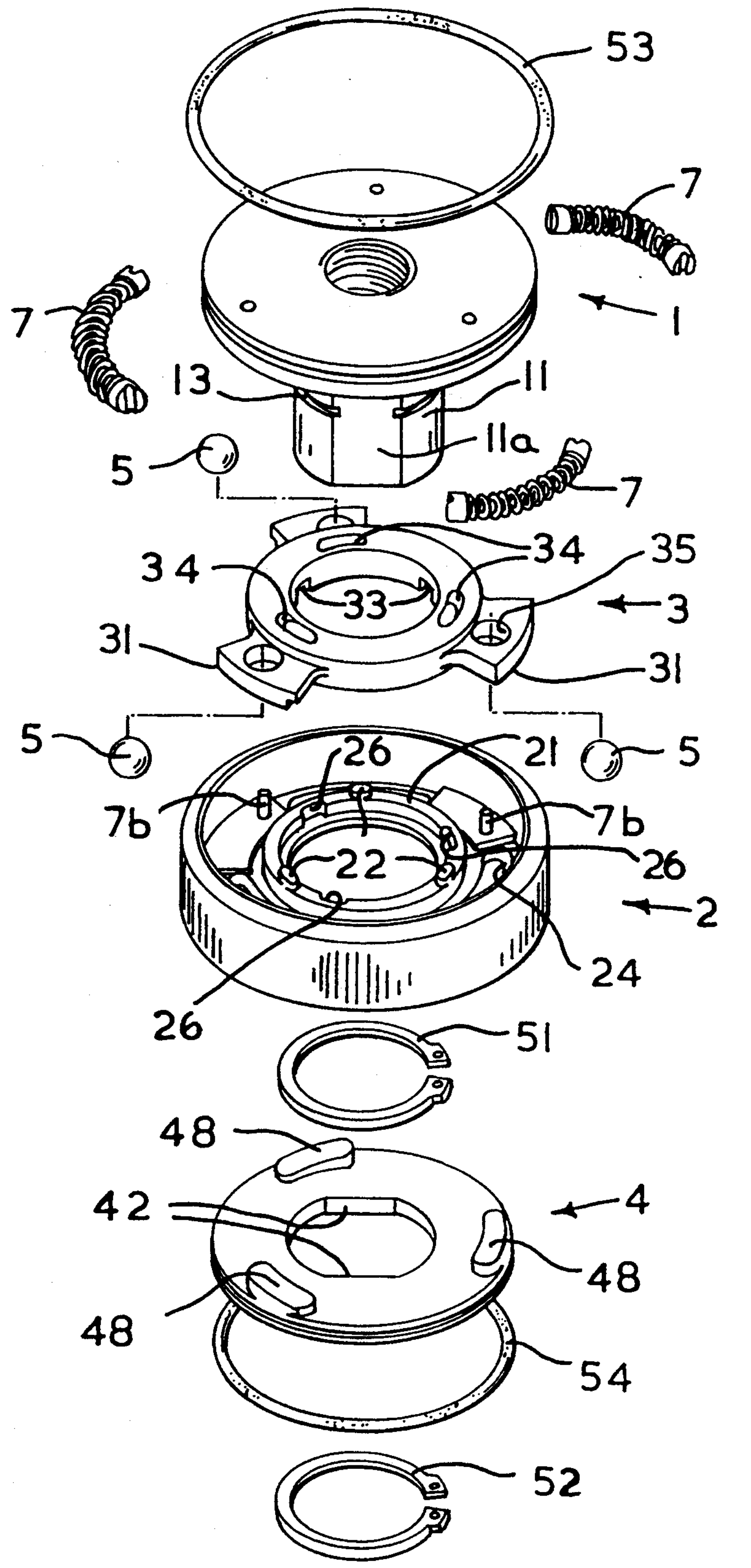
FIG. 2 is an exploded perspective view of the flange lock of FIG. 1 from the front or outer end thereof.
Figure 3:
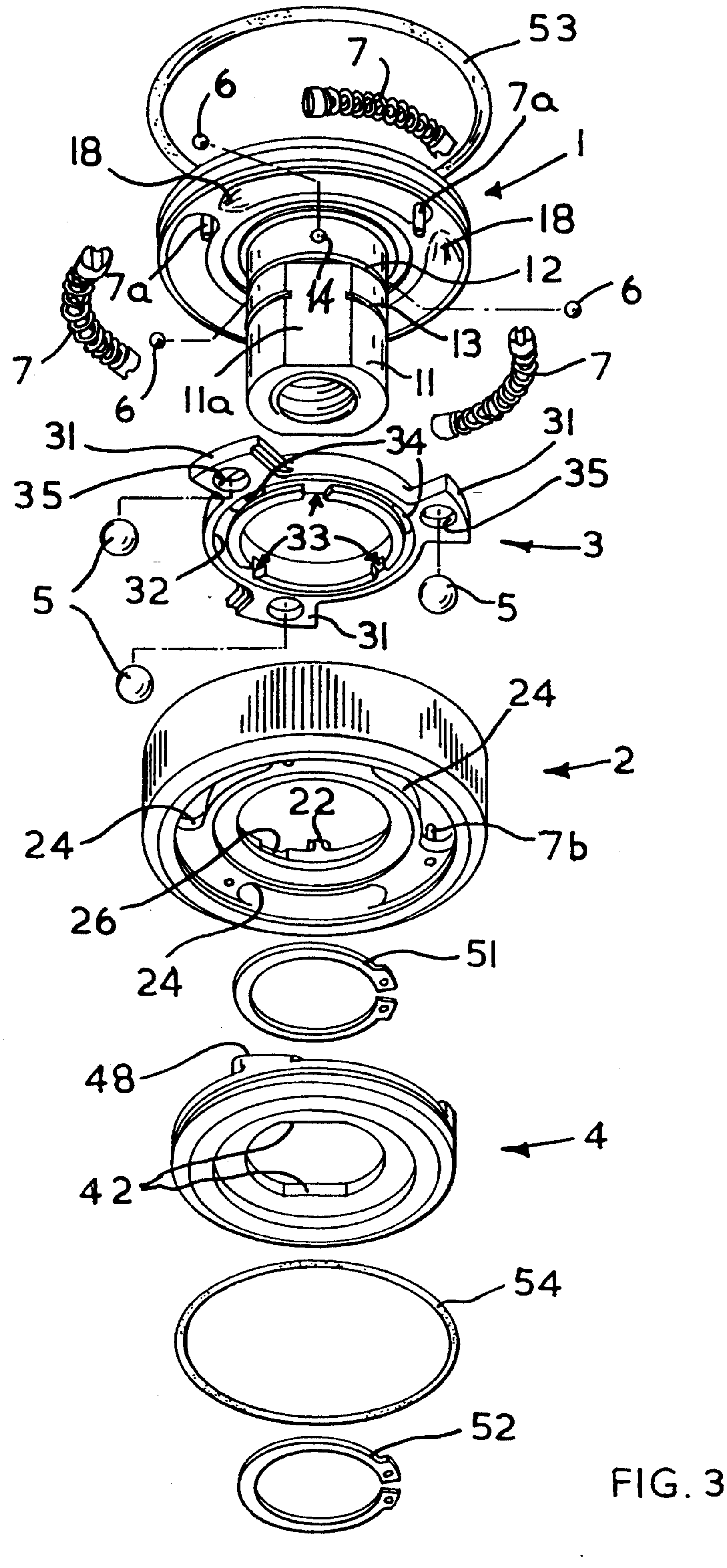
FIG. 3 is an exploded perspective view of the flange lock from the back or inner end thereof.
Figure 4:
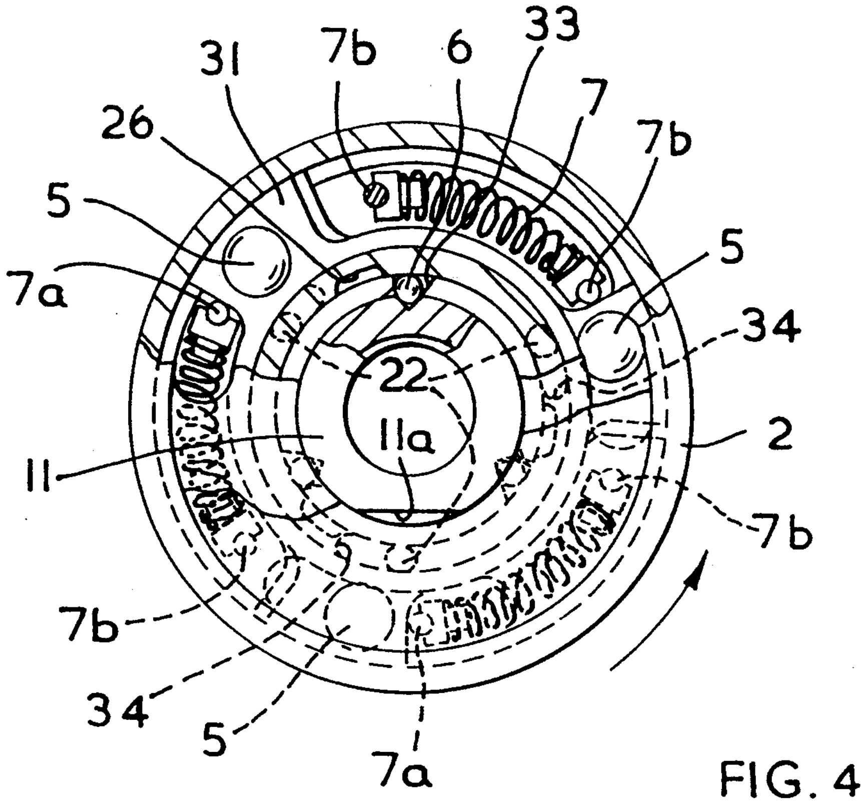
FIG. 4 is a horizontal cross section of the flange lock looking from the inner end or back thereof in the first separated condition of the lock.
Figure 5:
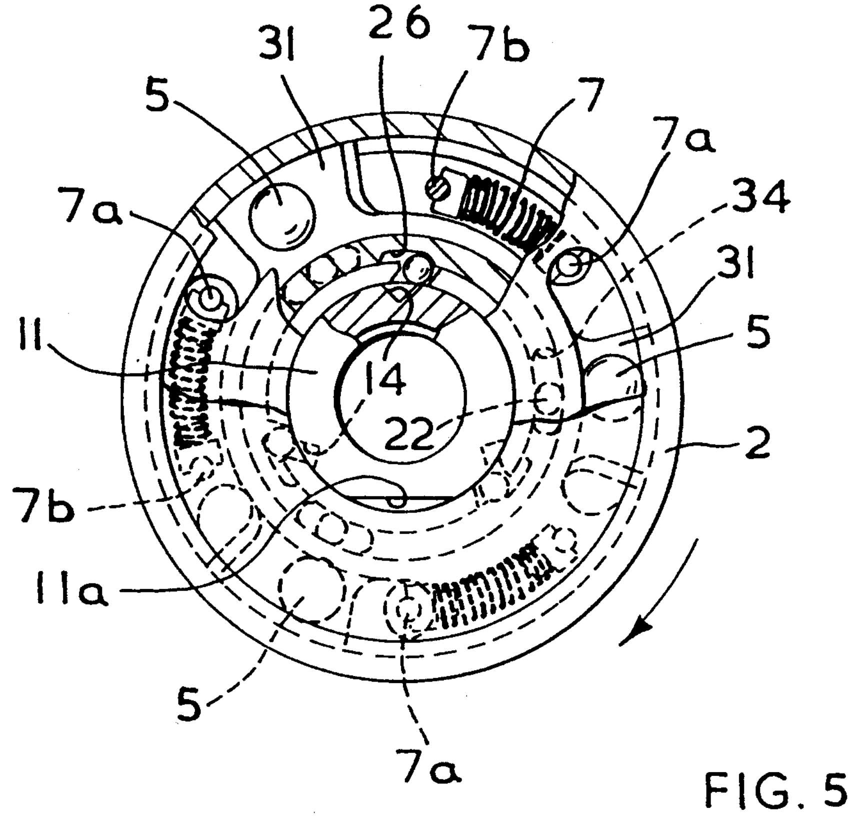
FIG. 5 is a sectional view like that of FIG. 4 showing the second, less separated condition of the flange lock.
Figure 7:
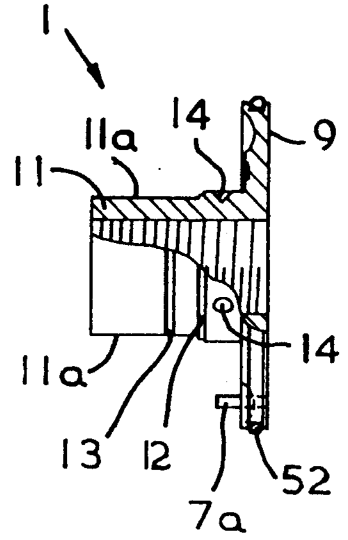
FIG. 7 is a partial cross section through the boss and integral outer flange.
Figure 8:
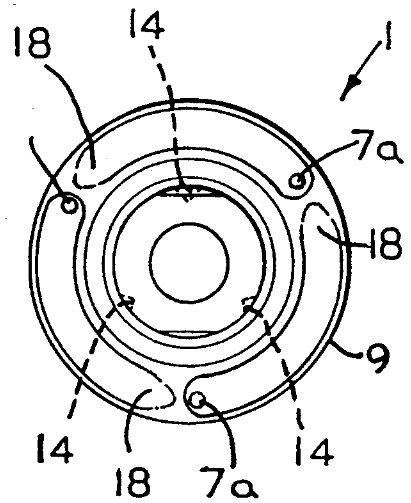
FIG. 8 is a view of the element of FIG. 7 looking from the left in FIG. 7 i.e. the back or inner side of the flange lock.
Figure 9:
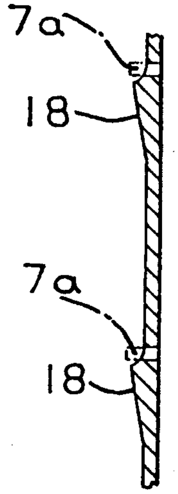
FIG. 9 is a circumferential section taken along the ramps of the outer flange shown in FIG. 8.
Figure 11:
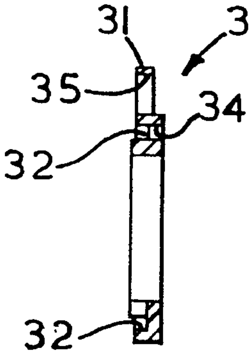
FIG. 11 is a section along the line XI—XI of FIG. 10.
Figure 10:
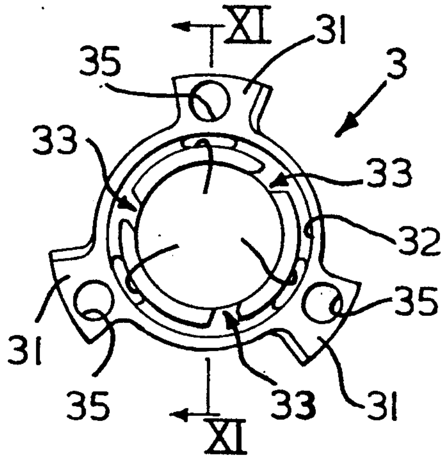
FIG. 10 shows the back side of the cage member of the flange lock.
Figure 13:
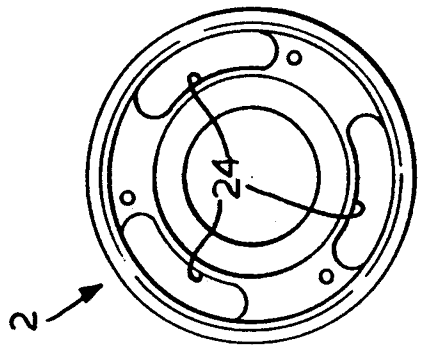
FIG. 13 shows the back side of the ring member.
Figure 14:
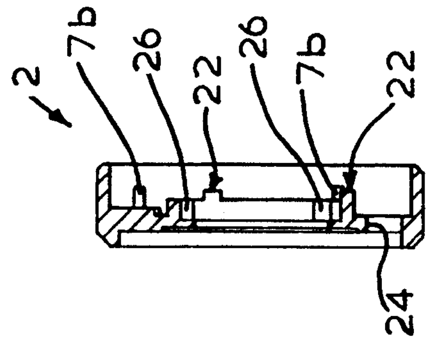
FIG. 14 is a section along the line XIV—XIV of FIG. 12.
Figure 12:
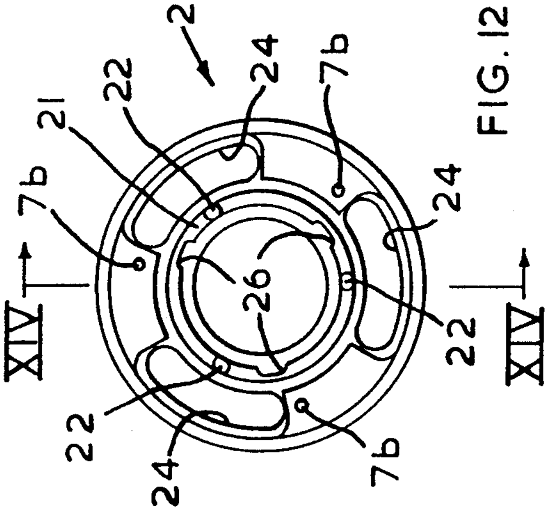
FIG. 12 shows the front side of the ring member of the flange lock.
Figure 17:
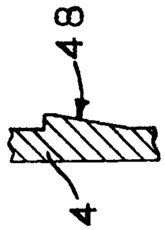
FIG. 17 is a circumferential partial section along the line XVII—XVII of FIG. 15.
Figure 16:
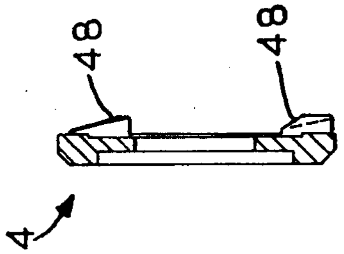
FIG. 16 is a cross section through the inner flange of FIG. 15.
Figure 15:
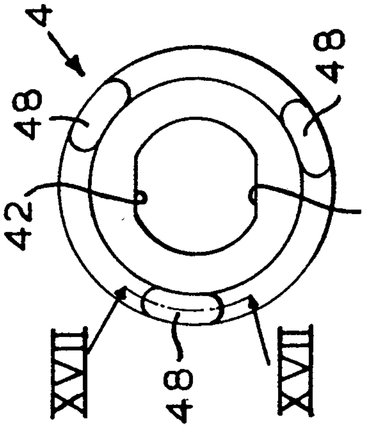
FIG. 15 is a view from the front side of the inner flange of the flange lock.

Referring now to the drawings, the flange lock is shown as used to clamp a grinding wheel or disk 8 on the spindle 10 of an angle grinder. It could also be used to clamp other rotating elements on to spindles such as a circular saw blade on the spindle of a circular saw. The flange lock consists of four major elements; a support member 1 comprising a flange 9 integrally mounted on the outer end of a sleeve-like centre portion or boss 11 which is threaded internally for threading on to the spindle 10 of the angle grinder; a ring element 2 which is rotatably mounted on the boss 11 of the support member 1; a disk-like cage element 3 which is also rotatably mounted on the boss 11 of the support member 1 between the flange 9 and the ring 2; and a clamping flange 4 non-rotatably mounted on the boss 11 of the support member 1 over the ring 2.

The elements 1, 2 and 3 are held against relative axial movement by a circlip 51 engaging in a groove 12 in the boss 11 which prevents axial movement of the elements 2 and 3 along the boss 11. Rotational movement of the clamping flange 4 on the boss 11 is prevented by cooperating flats 42, 11*a* on the disk 4 and boss 11 respectively. Axial movement of the flange 4 along the boss 11 is limited by the circlip 51 and a second circlip 52 which engages in a groove 13 in the boss 11.

The disk-like cage 3 has projections 31 containing holes 35 which receive support balls 5. The balls 5 fit between the flange 9 and the clamping flange 4 to maintain separation between these two elements. The degree of separation of the flange 9 and flange 4 depends on the position of the balls 5 with respect to circumferentially extending inclined surfaces or ramps 18, 48 on the flanges 9 and 4 respectively.

Rotation of the cage 3 in the clockwise direction relative to the flange 9 (looking towards the front of the grinding disk) is limited by three pins 7*a* standing up from the flange 9 which engage one side of each of the ball carrying projections 31 of the cage 3 and are normally pressed against the projections 31 by three compression springs 7 which extend between the pins 7*a* and pins 7*b* which project downwardly from the ring 2 intermediate the cage projections 31.

The cage 3 has an annular groove 32 extending along in its upper face (looking towards the back of the grinding disk i.e. from the inner side of the flange lock). In the radially inner face of the groove 32 are three radially inwardly extending slots 33 angled outwardly in the anti-clockwise direction. A small lock ball 6 fits in each slot 33. These slots 33 are aligned with recesses 14 in the outer circumferential face of the boss 11 of the support member and the balls 6 sit partly within the slots 33 and partly inside the recesses 14 in the boss of member 1. Between each slot 33 a short circumferential slot 34 is formed in the base of the groove 32.

The ring 2 fits over the cage 3 and is rotatable relative to the support member 1. The front side face of the ring 2 (i.e. the face away from the grinding disk) has an annular rib 21 which fits in the annular groove 31 in the cage 3. Three pins 22 standing up from the annular rib 21 engage in the circumferential slots 34 of the cage. Three recesses 26 are provided in the radially inner face of the rib 21. Three circumferential slots 24 are provided in the ring 2 outwardly of the rib 21 and in alignment with the balls 5 to allow free movement of the balls relative to the ring 2 and at the same time to allow the balls to engage through the ring 2 with the flange 4.

The flange 4 fits over the ring 2 being non-rotatably mounted on the boss 11 of the support member 1 by means of flats 42 engaging the corresponding flats 11*a* on the boss 11. The flange 4 can move axially on the boss 11, its axial movement being limited by the second circlip 52.

Before the flange lock is fitted on to the spindle of an angle grinder or the like (i.e. the rest position) the relationship of the parts is as follows.

The projections 31 of the cage 3 are pressed against the pins 7*a* of the flange 1 by the intermediary of the springs 7 pressing against the pins 7*b* of the ring 2. The pins 22 of the ring 2 in turn press against the ends of the slots 34 in the cage 3 to press the projections 31 of the cage 3 against the pins 7*a*. In this position the balls 5 are at the upper ends of the ramps on both the flange 1 and the flange 4 and the flange 4 is pressed against the circlip 52. Furthermore in this position the slots 33 in the cage 3 are aligned with the recesses 14 in the boss 11 and the recesses 26 are out of alignment with the slots 33 so that the inner face of the rib 21 holds the balls 6 in the slots 33 and recesses 14 so that the balls 6 lock the flange 1 and cage 3 against relative rotation.

When the flange lock is rotated on to the spindle by gripping the ring 2 the above condition is maintained since the rotation is in the direction which maintains the condition, i.e. the ring 2 urging the cage 3 into the position in which the projections 31 engage the pins 7a. The flange lock is tightened on to the grinding disk 8 with the flanges 9 and 4 remaining spaced by the balls 5 held between the ramps 18 and 48. The support member 1 is screwed on in the direction of rotation of the grinding disk so that it becomes tighter as the disk rotates.

In order to release the flange lock, the ring 2 is rotated anti-clockwise against springs 7 which results in the following. The recesses 26 move into alignment with the slots 33 and the balls 6 are now moved outwardly by the load on the flange 4 tending to move the balls 5 down the ramps 18, 48 thus rotating the cage 3 anti-clockwise relative to the flanges 9 and 4. As soon as the balls 6 move outwardly the lock between cage 3 and support member 1 is released and the cage 3 rotates relative to the flanges 9 and 4 (against the springs 7) to allow the balls 5 to run down the ramps 18, 48 and the flange 4 to move axially down the boss 11 thus relieving the pressure between the flange 4 and the grinding disk 8 so that the user can now relatively easily unscrew the flange lock by continuing to rotate the ring 2 anti-clockwise.

The maximum rotational movement of the cage against the spring action is about 15°. For release of the mechanism as described above less than 15° of movement is required.

Rubber seals 53 and 54 are provided between the ring 2 and flange 9 and flange 4 respectively to prevent the ingress of dirt.

While a particular embodiment of the invention has been described it will be understood that various modifications and variations may be made to the specific details referred to herein. For example, while in the embodiment illustrated separation balls 5 have been described it will be understood that other slidable elements and low friction bodies, particularly rolling elements, may be utilised.

What is claimed is

1. A flange lock for securing a disk on the spindle of a power tool, comprising:

a boss screwable on the spindle;

an outer flange fixed rigid with said boss and an inner flange non-rotatably mounted on the boss but axially movable thereon between an inner limit position in which the flanges are in a first separated condition and a second position in which the flanges are in a second less separated condition;

plurality of rolling members mounted between said flanges and movable between first positions in which the rolling members cooperate with ramps on said flanges to maintain said flanges in said first separated condition and second positions in which the inner flange is able to move towards the outer flange to said second, less separated condition;

means for releasably holding said rolling members in said first positions in such a manner that when the flange lock is screwed on to the power tool spindle to secure the disk thereon by engaging said inner flange against said disk with said flanges maintained in said first separated condition so that said flanges create pressure against said rolling members, release of said holding means resulting in said rolling members being urged by said pressure along said ramps to said second positions whereby pressure between the inner flange and the disk is relieved and unscrewing the flange lock is facilitated;

each flange having a number of said ramps equal to the number of rolling members, the ramps being arranged in facing pairs along which said rolling members are movable;

spring means urging said rolling members into said first positions;

said holding means including a ring member mounted for limited rotation on the boss intermediate said flanges and rotatable in the direction in which the flange lock is screwed on to the spindle to a first limit position in which said rolling members are locked in said first positions thereof adjacent upper ends of the ramps, rotation of the ring member in the opposite direction relative to the boss to a second limit position releasing the rolling members to permit them to run down the ramps;

three said rolling members being equally spaced around the flange lock by a cage member rotatably mounted on the boss intermediate said flanges;

said cage member including an annular wall member circumferentially between an inner face of said ring member and said boss;

said wall member having an opening therethrough in which a locking ball larger than the thickness of the wall is positioned;

said boss including a recess which in said first limit position of said ring member corresponding to the first positions of the rolling members is aligned with said opening and said locking ball is held partly in said opening and partly in said recess by said inner face of the ring member thus locking the cage against rotation relative to the boss; and rotation of said ring member to its second limit position aligning a recess in said inner face of said ring member with said opening in said annular wall of said cage member allowing the locking ball to disengage from the recess in the boss and permit the cage member to rotate relative to the boss so that the rolling members can move down said ramps.

2. A flange lock according to claim 1, in which said opening in the annular wall member of said cage member is inclined in the direction in which said rolling members move down the ramps.

3. A flange lock for a disk to be secured on a threaded spindle against a shoulder on said spindle, the lock comprising:

a) a boss for threaded engagement on said spindle;
b) a flange on an end of the boss;
c) a separation flange non-rotatably mounted on the boss between said flange and the disk to be secured;
d) circumferential ramps being arranged on at least one of the facing surfaces of said flanges;
e) low friction bodies on said ramps between said flanges and serving to separate them;
f) a cage to locate said bodies; and
g) a release member to lock said cage in a first position in which said flanges have a maximum separation and to release said cage whereby said bodies can move to a second position in which said flanges have a reduced separation.

4. A flange lock as claimed in claim 3, wherein said cage has a sleeve which is a close sliding fit on said boss, said sleeve has windows housing locking elements having greater radial extension than the thickness of said sleeve and in which said release member is a close sliding fit on said sleeve in the region of said windows and has notches in said second position of the member with respect to the cage to receive said locking elements, detents being provided in said boss into which said locking elements extend when said release member is in its first position and whereby said cage and boss are locked together.

5. A flange lock according to claim 4, wherein rotation of said release member in the loosening direction of rotation of said boss on said spindle from said first position and relative to said cage, brings said notches into register with said windows whereby said locking elements are permitted to exit said detents and enter said notches and release said cage relative to said boss, whereby said bodies ride down said ramps reducing the separation of said flanges.

6. A flange lock according to claim 5, wherein said windows have oblique side walls, so that, on rotation of the release member in said tightening direction relative to said cage, one wall tends to guide said locking elements radially inwardly as they are engaged by one end of said notches.

7. A flange lock according to claim 3, wherein said ramps are arranged so that, in the tightening direction of rotation of said boss on said spindle, said elements ride up the ramps towards said first position.

8. A flange lock according to claim 7, wherein said cage is spring biassed towards said first position.

9. A flange lock according to claim 8, wherein springs act between a stop on said flange and a stop on said release member, dogs on the release member engaging circumferential slots in said cage.

10. A flange lock for releasably securing a disk on a threaded spindle of a power tool, the flange lock comprising:

a threaded boss having a first flange and a central axis;

a second flange mounted non-rotatably on and axially displaceable along said boss, said second flange being movable along said axis towards and away from said first flange;

slidable elements located between said flanges and effecting axial separation of said flanges;

circumferentially extending ramps on at least one of said flanges and engaged by said slidable elements, movement of said slidable elements on and relative to said ramps in a circumferential direction about said axis enabling the axial separation of said flanges to change;

a cage rotatable about said boss and locating said slidable elements about said axis;

at least one lock member releasably engaging said boss to lock said cage in a first rotational position relative to said boss with said slidable elements positioned on and up said ramps to effect a particular axial separation of said flanges; and release of said lock member from said boss enabling said slidable elements to move along and down said ramps in said circumferential direction and rotate said cage to a second rotational position to effect a reduction in axial separation of said flanges.

11. The flange lock of claim 10, wherein said slidable elements comprise rolling elements.

12. The flange lock of claim 11, wherein said rolling elements comprise balls.

13. The flange lock of claim 10, wherein said lock member comprises a ball.

14. The flange lock of claim 13, wherein:

said lock member comprises a ball carried by said cage and releasably engageable in a locking recess in said boss; and further comprising:

a ring rotatable relative to said axis and said cage, said ring having a release recess in which said ball enters to release from said locking recess and allow said cage to rotate relative to said boss.

15. The flange lock of claim 10, further comprising a manually operable ring surrounding said cage and rotatable relative to said boss, said ring having an internal recess in which said lock member outwardly engages when in register therewith to unlock said cage for rotation relative to said boss.

16. The flange lock of claim 10, wherein said ring is interengaged with said cage to enable limited relative rotation between said ring and said cage with respect to said axis.

17. A flange lock, comprising:

an internally threaded boss having a fixed flange;

a separation flange non-rotatably mounted on said boss and movably axially on said boss towards and away from said fixed flange;

a cage rotatably mounted on said boss between said flanges, said cage having a plurality of holes therein;

a plurality of rolling elements located in said holes;

said cage having an inner wall with slots therethrough;

a plurality of lock members mounted in said cage slots and engageable in recesses in said boss to lock said cage against rotation relative to said boss;

a manually operable control ring rotatably mounted on said boss, an inner surface of said control ring having recesses therein, said inner surface in a first rotational position of said control ring relative to said boss holding said lock members in the boss recesses to lock the cage relative to the boss, rotation of said ring to a second rotational position relative to said boss allowing said lock members to move along said cage slots into said control ring recesses and out of said boss recesses to free said cage for rotation relative to said boss;

said rolling elements engaging opposing surfaces of said flanges and spacing said flanges apart; and at least one of said flange opposing surfaces having inclined portions engaged by said rolling elements in said first rotational position of said control ring to effect a maximum separation of said flanges, rotation of said control ring to said second rotational position relative to said boss allowing said rolling elements to move along said inclined portions and the separation of said flanges to reduce.

18. The flange lock of claim 17, wherein both said flanges have inclined portions engaged by said rolling elements.

19. The flange lock of claim 18, wherein the inclined portions of the respective flanges are oppositely inclined.

20. The flange lock of claim 17, wherein said rolling elements comprise balls.

21. The flange lock of claim 17, wherein said lock members comprise rolling members.

22. The flange lock of claim 17, wherein said inclined portions comprise ramps raised above and protruding from the respective disk surface.

23. A flange lock, comprising:

an axially extending threaded boss;

first and second flanges on said boss, both said flanges being non-rotatable relative to said boss;

one of said flanges being movable relative to the other axially along said boss;

slidable elements between said flanges and causing axial separation of said flanges;

a cage rotatable about said boss, said cage having openings locating therein said slidable elements, rotation of said cage relative to said boss moving said slidable elements about said boss to change said axial separation of said flanges;

a lock member carried by said cage and engaging a detent associated with said boss to lock said cage in a first rotational position relative to said boss with said flanges having a particular separation; and said lock member being releasable from said detent to allow rotation of said cage to a second rotational position relative to said boss with said flanges then having a different separation.

24. The flange lock of claim 23, further comprising a control ring rotatable about said boss, rotation of said control ring in one direction causing said lock member to effect said locking of said cage, and rotation of said control ring in an opposite direction releasing said lock member to allow said rotation of said cage.

25. The flange lock of claim 23, wherein said slidable elements comprise rolling elements.

26. The flange lock of claim 23, wherein opposing faces of said flanges have ramps contacted by said slidable elements.

* * * * *